(12) United States Patent
Rhee et al.

(10) Patent No.: US 7,017,156 B1
(45) Date of Patent: Mar. 21, 2006

(54) SYSTEM FOR COMPUTING AN ESTIMATE EXECUTION TIME BY TOTALING THE TIME VALUE BASE ON AN ARCHITECTURE OR A SOFTWARE OPERATING ENVIRONMENT

(75) Inventors: Ann Rhee, Foster City, CA (US); Sumanta Chatterjee, Fremont, CA (US); Juan Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 648 days.

(21) Appl. No.: 09/967,458

(22) Filed: Sep. 27, 2001

Related U.S. Application Data

(63) Continuation-in-part of application No. 09/141,664, filed on Aug. 28, 1998, now Pat. No. 6,341,303, and a continuation-in-part of application No. 09/141,666, filed on Aug. 28, 1998, now Pat. No. 6,457,008.

(51) Int. Cl.
*G06F 9/46* (2006.01)
(52) U.S. Cl. .................. 718/101; 718/100; 718/102
(58) Field of Classification Search ............. 718/100, 718/102, 103, 104, 105, 107, 101
See application file for complete search history.

(56) References Cited

U.S. PATENT DOCUMENTS

| | | | |
|---|---|---|---|
| 4,283,771 A * | 8/1981 | Chang .......................... 707/6 |
| 5,010,482 A | 4/1991 | Keller et al. |
| 5,325,525 A | 6/1994 | Shan et al. |
| 5,355,475 A * | 10/1994 | Tanaka et al. ............. 707/205 |
| 5,392,430 A * | 2/1995 | Chen et al. .................. 718/102 |
| 5,452,452 A | 9/1995 | Gaetner et al. |
| 5,515,538 A | 5/1996 | Kleiman |
| 5,566,349 A | 10/1996 | Trout |
| 5,623,647 A * | 4/1997 | Maitra ....................... 713/501 |
| 5,815,689 A | 9/1998 | Shaw et al. |
| 5,828,568 A * | 10/1998 | Sunakawa et al. ........... 700/79 |
| 5,842,226 A | 11/1998 | Barton et al. |
| 5,884,077 A | 3/1999 | Suzuki |
| 6,003,061 A | 12/1999 | Jones et al. |
| 6,021,508 A | 2/2000 | Schmuck et al. |
| 6,085,216 A | 7/2000 | Huberman et al. |
| 6,085,218 A | 7/2000 | Carmon |
| 6,085,333 A | 7/2000 | DeKoning et al. |
| 6,105,053 A | 8/2000 | Kimmel et al. |
| 6,160,798 A | 12/2000 | Reed et al. |
| 6,182,133 B1 * | 1/2001 | Horvitz ...................... 709/223 |
| 6,223,201 B1 | 4/2001 | Reznak |

(Continued)

OTHER PUBLICATIONS

Logan G. Harbaugh, *Balancing The Load*, TechWeb, Jan. 25, 1999, pp. 1-14 http://www.internetweek.com/reviews/rev012599.htm.

(Continued)

*Primary Examiner*—Meng-Al T. An
*Assistant Examiner*—Lilian Vo
(74) *Attorney, Agent, or Firm*—Bingham McCutchen LLP

(57) ABSTRACT

Access to computer system resources is regulated by computing an estimated execution time for an operation which seeks to use the resources. Once computed, the estimated execution time is used to make decisions about granting the operation access to the computer system resources. Operations which have an estimated execution time greater than a user-supplied maximum estimated execution time allowable for the operation are denied access to the computer system resources. Operations which are denied access are rescheduled for later operation, queued, or aborted.

18 Claims, 3 Drawing Sheets

U.S. PATENT DOCUMENTS

| | | | |
|---|---|---|---|
| 6,263,298 B1 * | 7/2001 | Kerman et al. | 702/186 |
| 6,263,358 B1 * | 7/2001 | Lee et al. | 718/100 |
| 6,263,359 B1 | 7/2001 | Fong et al. | |
| 6,341,303 B1 | 1/2002 | Rhee et al. | |
| 6,353,844 B1 | 3/2002 | Bitar et al. | |
| 6,366,915 B1 * | 4/2002 | Rubert et al. | 707/10 |
| 6,366,945 B1 | 4/2002 | Fong et al. | |
| 6,385,637 B1 * | 5/2002 | Peters et al. | 718/107 |
| 6,385,638 B1 * | 5/2002 | Baker-Harvey | 718/107 |
| 6,415,190 B1 * | 7/2002 | Colas et al. | 700/79 |
| 6,415,384 B1 | 7/2002 | Dave | |
| 6,430,594 B1 | 8/2002 | Akiyama et al. | |
| 6,438,704 B1 | 8/2002 | Harris et al. | |
| 6,463,457 B1 | 10/2002 | Armentrout et al. | |
| 6,496,848 B1 * | 12/2002 | Nankaku | 718/100 |
| 6,550,042 B1 * | 4/2003 | Dave | 716/5 |
| 6,563,793 B1 | 5/2003 | Golden et al. | |
| 6,581,055 B1 * | 6/2003 | Ziauddin et al. | 707/4 |
| 6,600,963 B1 * | 7/2003 | Loise et al. | 700/81 |
| 6,601,035 B1 * | 7/2003 | Panagos et al. | 705/8 |
| 6,643,367 B1 | 11/2003 | White-Hauser | |
| 6,667,988 B1 | 12/2003 | Liu et al. | |
| 6,714,960 B1 | 3/2004 | Bitar et al. | |
| 6,779,182 B1 | 8/2004 | Zolnowsky | |
| 6,792,445 B1 * | 9/2004 | Jones et al. | 718/107 |
| 2002/0019879 A1 | 2/2002 | Jasen et al. | |
| 2003/0021228 A1 | 1/2003 | Nakano et al. | |
| 2003/0028852 A1 * | 2/2003 | Thurman et al. | 716/12 |
| 2003/0120871 A1 * | 6/2003 | Ayaki et al. | 711/137 |
| 2003/0200252 A1 * | 10/2003 | Krum | 709/102 |
| 2004/0039935 A1 * | 2/2004 | Pisecky | 713/200 |
| 2004/0073603 A1 * | 4/2004 | Ellis, III | 709/201 |
| 2004/0073735 A1 | 4/2004 | Boom et al. | |

OTHER PUBLICATIONS

Sitara Networks; QoS Glossory, Jul. 2, 2001, pp. 1-18, http://www.sitaranetworks.com/what_is_qos_glossary.cfm.

* cited by examiner

SYSTEM FOR COMPUTING AN ESTIMATE EXECUTION TIME BY TOTALING THE TIME VALUE BASE ON AN ARCHITECTURE OR A SOFTWARE OPERATING ENVIRONMENT

RELATED APPLICATION INFORMATION

This application is continuation in part of U.S. patent application Ser. No. 09/141,664 filed Aug. 28, 1998, now U.S. Pat. No. 6,341,303 entitled "Pluggable Resource Scheduling Policies" and naming Ann Rhee, Sumanta K. Chatterjee, Juan R. Loaiza and Kesavan Srinivasan as inventors, which application is incorporated herein by reference, in its entirety, and is a continuation-in-part of U.S. patent application Ser. No. 09/141,666 filed Aug. 28, 1998, now U.S. Pat. No. 6,457,008 entitled "Resource Scheduler" and naming Ann Rhee, Sumanta K. Chatterjee, Juan R. Loaiza and Kesavan Srinivasan as inventors, which application is incorporated herein by reference, in its entirety.

FIELD OF THE INVENTION

The invention relates to computer systems, and more particularly to methods for regulating access to data retrieval systems, using estimated performance times for database operations.

BACKGROUND

In many data retrieval systems, especially large, multi-use database systems, there are frequently more operations submitted to the system than the system can support at one time. To improve efficiency of the data retrieval system, it is useful to impose some sort of resource scheduling criteria on the operations seeking to retrieve data from the data retrieval system. One scheduling criterion that is frequently used is execution time. Operations that are running for a long time, and consuming a lot of resources, have their access restricted. This is typically done by a human monitor or administrator of the data retrieval system, who checks the status of the operations running on the data retrieval system, and selectively de-activates or re-schedules operations that have been running for too long. Long-running operations can be re-scheduled to run at less-busy times, such as at night, or after business hours.

This procedure, however, has several drawbacks. It requires the intervention of an administrator, who must constantly monitor the status of all of the operations running on the data retrieval system. Furthermore, de-activating a long-running operation results in system resource wastage, since the partially-completed processing of the operation is frequently lost upon de-activation. Additionally, users of the data retrieval system are inconvenienced because they don't find out that their operations were consuming too many resources until after the operation has been running for a lengthy period of time.

SUMMARY OF THE INVENTION

In an aspect of an embodiment of the invention, operation times are estimated before execution of the operation, and resource scheduling decisions are made based upon the estimates.

In another aspect of an embodiment of the invention, an operation is aborted when an estimated execution time exceeds a maximum execution time criterion.

In another aspect of an embodiment of the invention, an operation is re-scheduled when an estimated execution time exceeds a maximum execution time criterion.

In another aspect of an embodiment of the invention, an operation is switched from a first operation class to a second operation class when an estimated execution time exceeds a maximum execution time criterion.

DETAILED DESCRIPTION OF THE PREFERRED EMBODIMENTS

Figure 1:
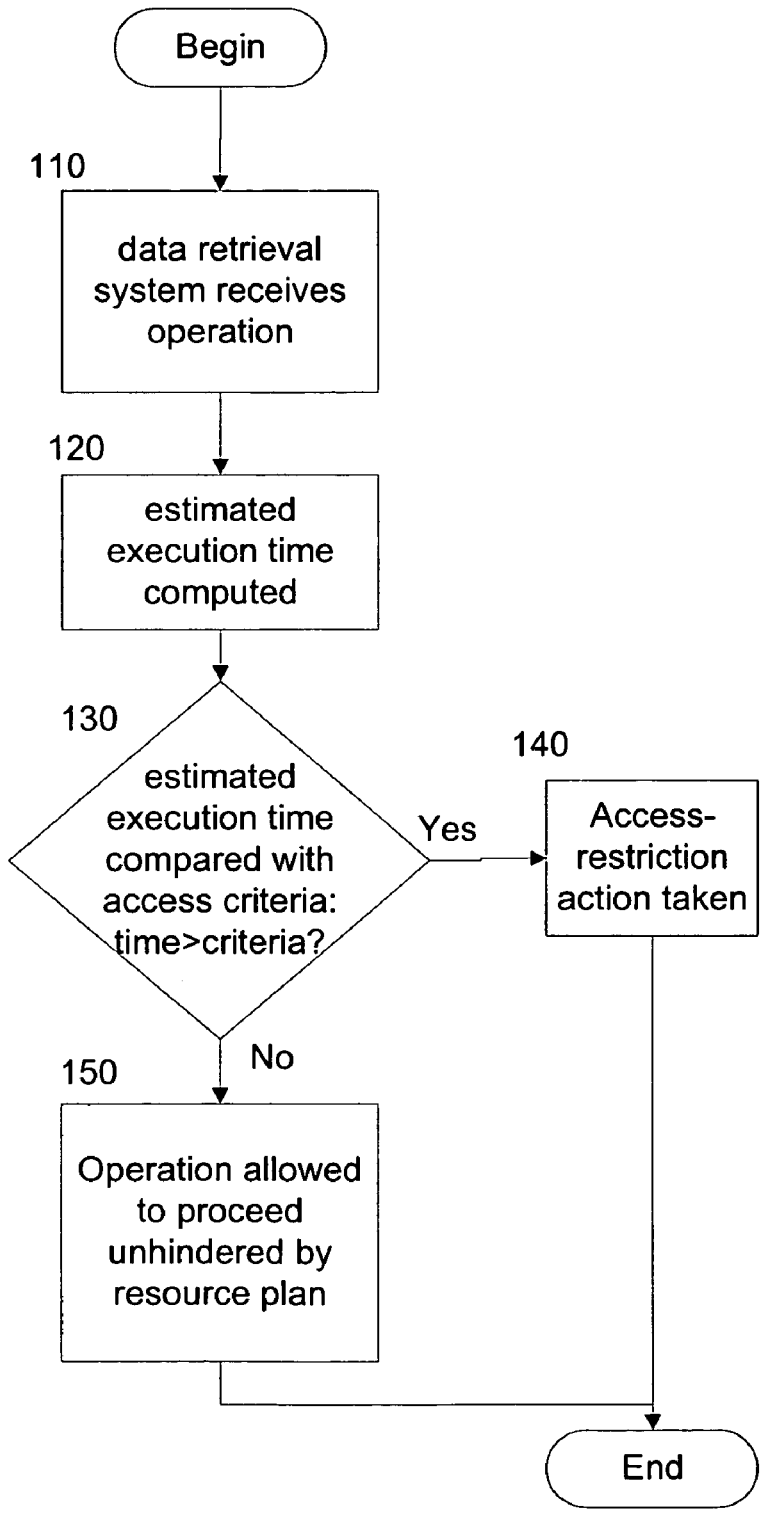
FIG. 1 is a flowchart of a method for using an estimated execution time of an operation.

In an embodiment, an operation on a file system contains one or more elements. For example, a query on a database contains a list of tables that the query needs to access, as well as elements defining things such as how the tables are joined, or which fields in the tables will be accessed. An example query, using SQL, is the following:

SELECT Employee.Name, Employee.Address, Company.Name, Company.Address FROM Employee, Company JOIN Employee.Key=Company.Key.

This query accesses the tables Employee and Company and retrieves the data in the Name and Address fields of each table, for all records where the Key field of the Employee table matches the Key field of the Company table.

An execution time of the operation is estimated. The execution time is estimated by examining the various elements of the operation. For each element, a calculation is made of how long that element will take to execute. For example, the time required to do the JOIN between the Employee and Company table is calculated. The time required to select the requested records from the joined tables is also computed. Any other relevant execution times for the other elements of the query are also computed. This calculation takes into account the attributes of the machine architecture that the operation is running on.

For example, where the element of the operation is a database table, the calculation will compute how long it takes the particular machine to do an I/O action on the table. This calculation includes the effect of any system resources, such as a buffer cache, that might alter the number or speed of I/O operations. If in the execution of the query the table is loaded into a buffer, then the I/O operations on that table use the buffered copy, and are therefore faster. The estimation calculation takes this buffering into consideration. For example, the estimation calculation recognizes when a buffered table is being accessed, rather than a table stored on a long-term storage device, and uses an I/O time for buffer access, not for mass storage access.

The estimation calculation has access to a collection of time values, specific to the architecture that the operation is running on. These time values specify accurate estimates of how long various actions take. For example, how long it takes the architecture to process an I/O request to mass storage, how long it takes the architecture to process an I/O request to a buffer, how long it takes the architecture to process one instruction cycle of CPU computation, etc.

The estimation calculation also has access to a collection of time values specific to the software operating environment that the operation is running under. These time values specify accurate estimates of how long various software actions take. For example, how many cycles of CPU time a "table join" element takes, or how many software locks a particular operation element will use, and how many CPU cycles it takes to create a software lock.

The estimation calculation parses through all of the various elements of the operation, and totals up all of the time estimates generated for each element of the operation. This total time estimation is then made available for use as an estimated execution time for the operation.

In an embodiment, once the estimated execution time for an operation is computed, the estimated execution time is used to automatically manage access to the data retrieval system. The data retrieval system has associated with it a resource plan. The resource plan is a plan that schedules access to the various system resources in the data retrieval system amongst the operations that seek to use these resources. For example, the resource plan specifies which operations have priority over other operations in accessing system resources, and/or specifies a partitioning scheme whereby operations share access to a resource. An example of a resource plan using multiple classes of operations, or resource consumer groups, is disclosed in U.S. patent application Ser. No. 09/141,666, filed on Aug. 28, 1998, entitled "Resource Scheduler", which application is incorporated herein by reference in its entirety.

The resource plan contains access criteria. The access criteria define conditions that, when met, cause an access-regulation decision about the operation's access to the data retrieval system to automatically be made. For example, the access criteria define a maximum allowable execution time for an operation. An operation that exceeds this maximum allowable execution time is automatically aborted. An appropriate error message or other response can also be generated at this time.

Alternatively, an operation that exceeds this maximum allowable execution time is automatically re-scheduled to run at a later time, according to the access criteria defined for that operation. For example, the access criteria specify that any operation that has an estimated execution time greater than 30 minutes will be automatically re-scheduled to execute at 10:00 p.m. (when the data retrieval system will presumably be less busy). Optionally, at this later time the operation is again checked against the resource plan in effect at that later time, and another access-regulation decision is made based upon the resource plan then in effect.

In another embodiment, where the resource plan recognizes multiple resource consumer groups, the operation is automatically re-classified from a first resource consumer group to a second resource consumer group, if the operation's estimated execution time exceeds a maximum estimated execution time as specified in the access criteria for the first resource consumer group. The second resource consumer group may be tailored to processing of larger operations, whereas the first resource consumer group may be tailored to smaller operations.

Other access-regulation actions are also possible using estimated execution times. For example, operations which are estimated to execute in less time than a minimum estimated execution time may be re-classified from one resource consumer group to another. The particular access-regulation actions taken are design choices for those skilled in the art, and are not critical to the invention.

A flow chart of a method of using an estimated execution time is discussed in FIG. 1. At step 110, an operation is submitted to the data retrieval system. At step 120, the operation's estimated execution time is computed as discussed above. At step 130, the operation's estimated execution time is compared with access criteria that specify the maximum allowable estimated execution time for the operation. At step 140, where the estimated execution time exceeds the maximum allowable estimated execution time, an action is taken, based upon the access criteria relevant to the operation, such as the access criteria for the operation class the operation belongs to. This action can include aborting the operation, re-scheduling the operation, changing the class of an operation, or any other relevant action. At step 150, where the estimated execution time does not exceed the maximum allowable estimated execution time, the operation is allowed to proceed unhindered by the resource plan.

System Architecture Overview

Figure 2:
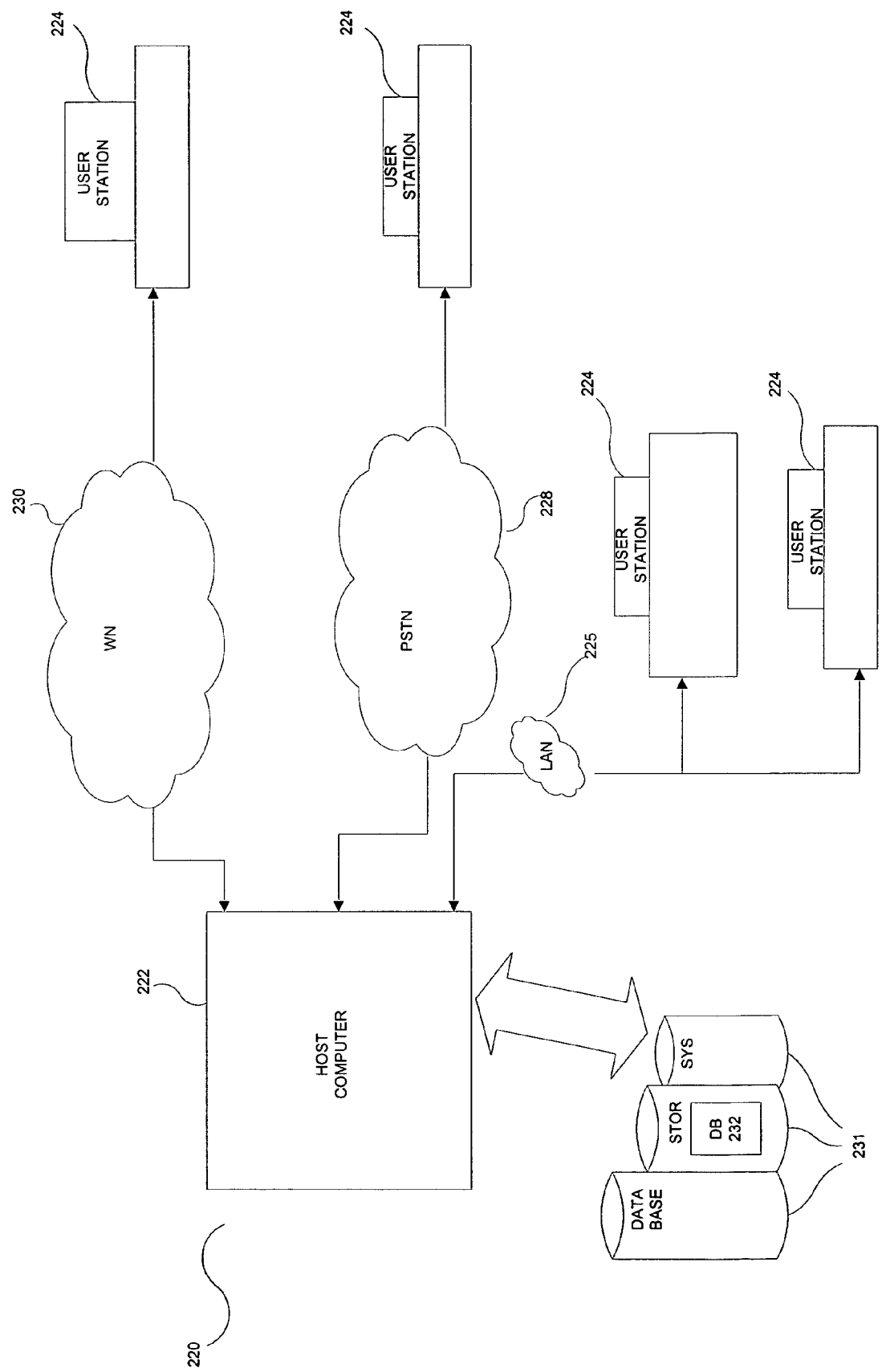
FIG. 2 is a representation of a computer system in accordance with an embodiment of the invention.

Referring to FIG. 2, in an embodiment, a computer system 220 includes a host computer 222 connected to a plurality of individual user stations 224. In an embodiment, the user stations 224 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 224 are connected to the host computer 222 via a local area network ("LAN") 225. Other user stations 224 are remotely connected to the host computer 222 via a public telephone switched network ("PSTN") 228 and/or a wireless network 230.

In an embodiment, the host computer 222 operates in conjunction with a data storage system 231, wherein the data storage system 231 contains a database 232 that is readily accessible by the host computer 222.

In alternative embodiments, the database 232 may be resident on the host computer, stored, e.g., in the host computer's ROM, PROM, EPROM, or any other memory chip, and/or its hard disk. In yet alternative embodiments, the database 232 may be read by the host computer 222 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 222 can access two or more databases 232, stored in a variety of mediums, as previously discussed.

Figure 3:
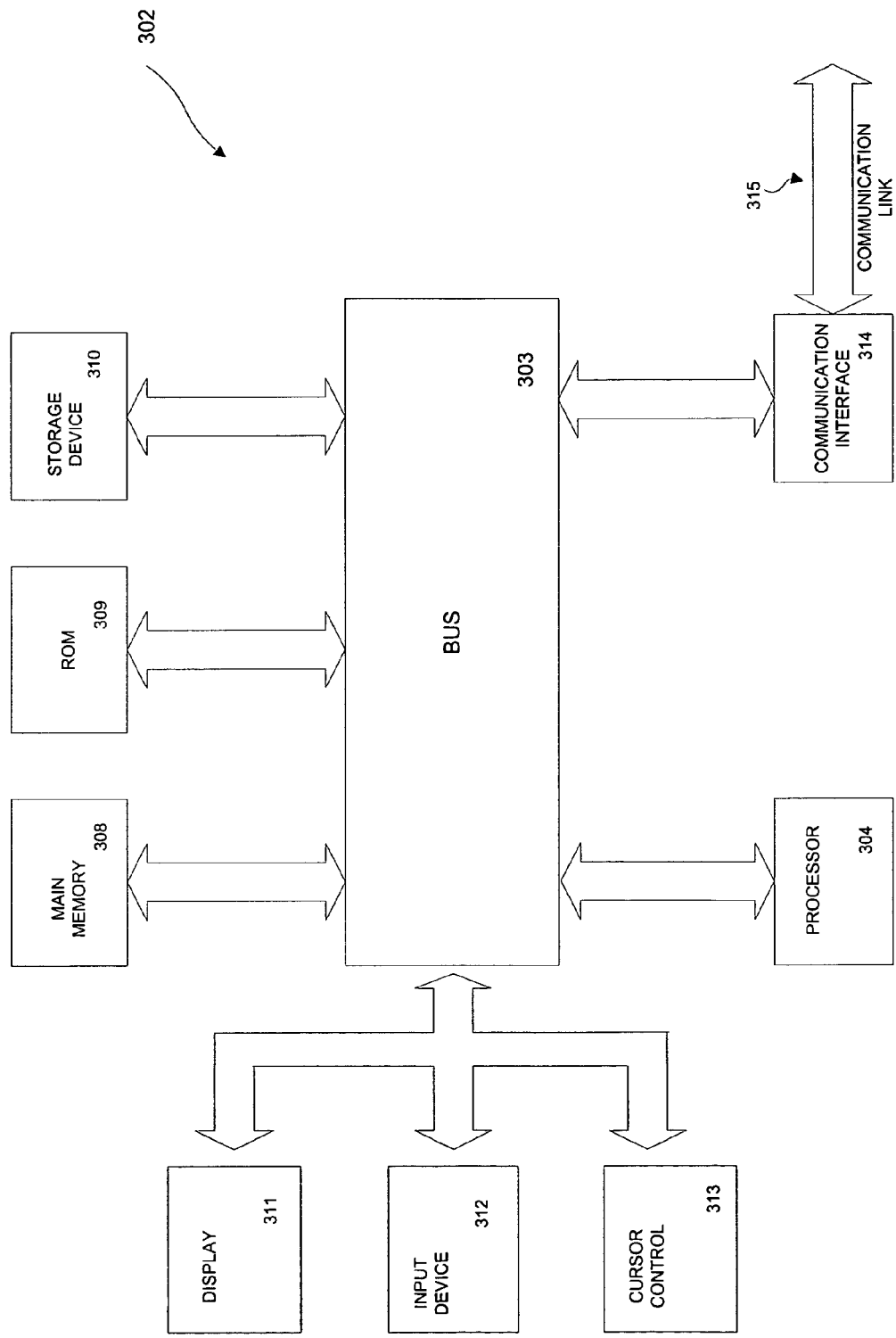
FIG. 3 is a representation of a processing unit in accordance with an embodiment of the invention.

Referring to FIG. 3, in an embodiment, each user station 224 and the host computer 222, each referred to generally as a processing unit, embodies a general architecture 302. A processing unit includes a bus 303 or other communication mechanism for communicating instructions, messages and data, collectively, information, and one or more processors 304 coupled with the bus 303 for processing information. A processing unit also includes a main memory 308, such as a random access memory (RAM) or other dynamic storage device, coupled to the bus 303 for storing dynamic data and instructions to be executed by the processor(s) 304. The main memory 308 also may be used for storing temporary data, i.e., variables, or other intermediate information during execution of instructions by the processor(s) 304.

A processing unit may further include a read only memory (ROM) 309 or other static storage device coupled to the bus 303 for storing static data and instructions for the processor(s) 304. A storage device 310, such as a magnetic disk or optical disk, may also be provided and coupled to the bus 303 for storing data and instructions for the processor(s) 304.

A processing unit may be coupled via the bus 303 to a display device 311, such as, but not limited to, a cathode ray tube (CRT), for displaying information to a user. An input device 312, including alphanumeric and other keys, is coupled to the bus 303 for communicating information and command selections to the processor(s) 304. Another type of user input device may include a cursor control 313, such as, but not limited to, a mouse, a trackball, a fingerpad, or cursor direction keys, for communicating direction information and command selections to the processor(s) 304 and for controlling cursor movement on the display 311.

According to one embodiment of the invention, the individual processing units perform specific operations by their respective processor(s) 304 executing one or more sequences of one or more instructions contained in the main memory 308. Such instructions may be read into the main memory 308 from another computer-usable medium, such as the ROM 309 or the storage device 310. Execution of the sequences of instructions contained in the main memory 308 causes the processor(s) 304 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 304. Such a medium may take many forms, including, but not limited to, non-volatile, volatile and transmission media. Non-volatile media, i.e., media that can retain information in the absence of power, includes the ROM 309. Volatile media, i.e., media that can not retain information in the absence of power, includes the main memory 308. Transmission media includes coaxial cables, copper wire and fiber optics, including the wires that comprise the bus 303. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 304 can retrieve information.

Various forms of computer-usable media may be involved in providing one or more sequences of one or more instructions to the processor(s) 304 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 303 may receive the infrared signals and place the instructions therein on the bus 303. The bus 303 may carry the instructions to the main memory 308, from which the processor(s) 304 thereafter retrieves and executes the instructions. The instructions received by the main memory 308 may optionally be stored on the storage device 310, either before or after their execution by the processor(s) 304.

Each processing unit may also include a communication interface 314 coupled to the bus 303. The communication interface 314 provides two-way communication between the respective user stations 224 and the host computer 222. The communication interface 314 of a respective processing unit transmits and receives electrical, electromagnetic or optical signals that include data streams representing various types of information, including instructions, messages and data.

A communication link 315 links a respective user station 224 and a host computer 222. The communication link 315 may be a LAN 225, in which case the communication interface 314 may be a LAN card. Alternatively, the communication link 315 may be a PSTN 228, in which case the communication interface 314 may be an integrated services digital network (ISDN) card or a modem. Also, as a further alternative, the communication link 315 may be a wireless network 230.

A processing unit may transmit and receive messages, data, and instructions, including program, i.e., application, code, through its respective communication link 315 and communication interface 314. Received program code may be executed by the respective processor(s) 304 as it is received, and/or stored in the storage device 310, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A computer-implemented method for managing access to a computer resource by an operation, comprising:

receiving an access criterion comprising a maximum estimated execution time;

computing an estimated execution time for the operation, the estimated execution time representing an estimate of an execution time for the operation;

comparing the estimated execution time with the maximum estimated execution time; and taking an access-regulation action if the estimated execution time exceeds the maximum estimated execution time;

wherein the estimated execution time for the operation is computed by:

determining time values for respective actions in the operation; and totaling the time values, wherein one of the time values is determined based on an architecture on which the operation will be run or based on a software operating environment in which the operation will be run.

2. The computer-implemented method of claim 1, wherein the access-regulation action comprises denying the operation access to the resource.

3. The computer-implemented method of claim 1, wherein the access-regulation action comprises re-scheduling the operation to run at a later time.

4. The computer-implemented method of claim 1, wherein the access-regulation action comprises switching the operation from a first class to a second class.

5. The computer-implemented method of claim 1, wherein the access criterion is part of a resource plan, the resource plan comprising a plurality of operation classes.

6. The computer-implemented method of claim 1, wherein the step of computing is performed before an execution of the operation.

7. A computer program product that includes a tangible medium readable by a processor, the medium comprising a sequence of instructions which, when executed by said processor, causes said processor to execute a method for managing access to a computer resource by an operation, comprising:
   receiving an access criterion comprising a maximum estimated execution time;
   computing an estimated execution time for the operation, the estimated execution time representing an estimate of an execution time for the operation;
   comparing the estimated execution time with the maximum estimated execution time; and
   taking an access-regulation action if the estimated execution time exceeds the maximum estimated execution time;
   wherein the estimated execution time for the operation is computed by:
   determining time values for respective actions in the operation; and
   totaling the time values, wherein one of the time values is determined based on an architecture on which the operation will be run or based on a software operating environment in which the operation will be run.

8. The computer program product of claim 7, wherein the access-regulation action comprises denying the operation access to the resource.

9. The computer program product of claim 7, wherein the access-regulation action comprises re-scheduling the operation to run at a later time.

10. The computer program product of claim 7, wherein the access-regulation action comprises switching the operation from a first class to a second class.

11. The computer program product of claim 7, wherein the access criterion is part of a resource plan, the resource plan comprising a plurality of operation classes.

12. The computer program product of claim 7, wherein the step of computing is performed before an execution of the operation.

13. A computer implemented system for managing access to a computer resource by an operation, comprising:
   an access criterion comprising a maximum estimated execution time;
   an execution time comparison module for receiving an estimated execution time of the operation and comparing the estimated execution time with the maximum estimated execution time, the estimated execution time representing an estimate of an execution time for the operation; and
   an access regulation module for taking an access regulation action if the estimated execution time exceeds the maximum estimated execution time;
   wherein the execution time comparison module determines time values for respective actions in the operation, and totals the time values; and
   wherein the execution time comparison module determines one of the time values based on an architecture on which the operation will be run or based on a software operating environment in which the operation will be run.

14. The computer implemented system of claim 13, wherein the access-regulation action comprises denying the operation access to the resource.

15. The computer implemented system of claim 13, wherein the access-regulation action comprises re-scheduling the operation to run at a later time.

16. The computer implemented system of claim 13, wherein the access-regulation action comprises switching the operation from a first class to a second class.

17. The computer implemented system of claim 13, wherein the access criterion is part of a resource plan, the resource plan comprising a plurality of operation classes.

18. The computer-implemented system of claim 13, wherein the estimated execution time is determined before an execution of the operation.

* * * * *